Patented Jan. 13, 1942

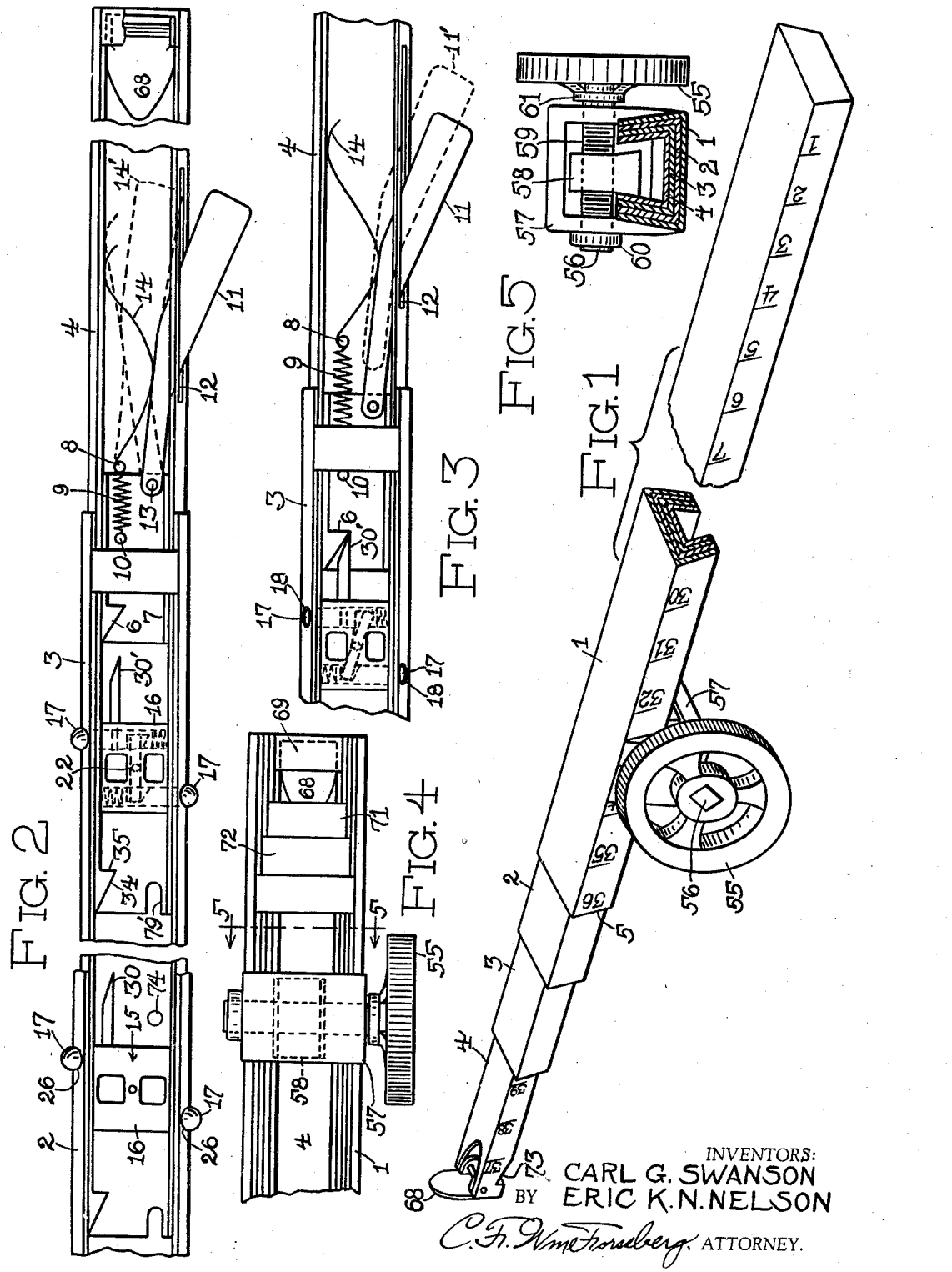

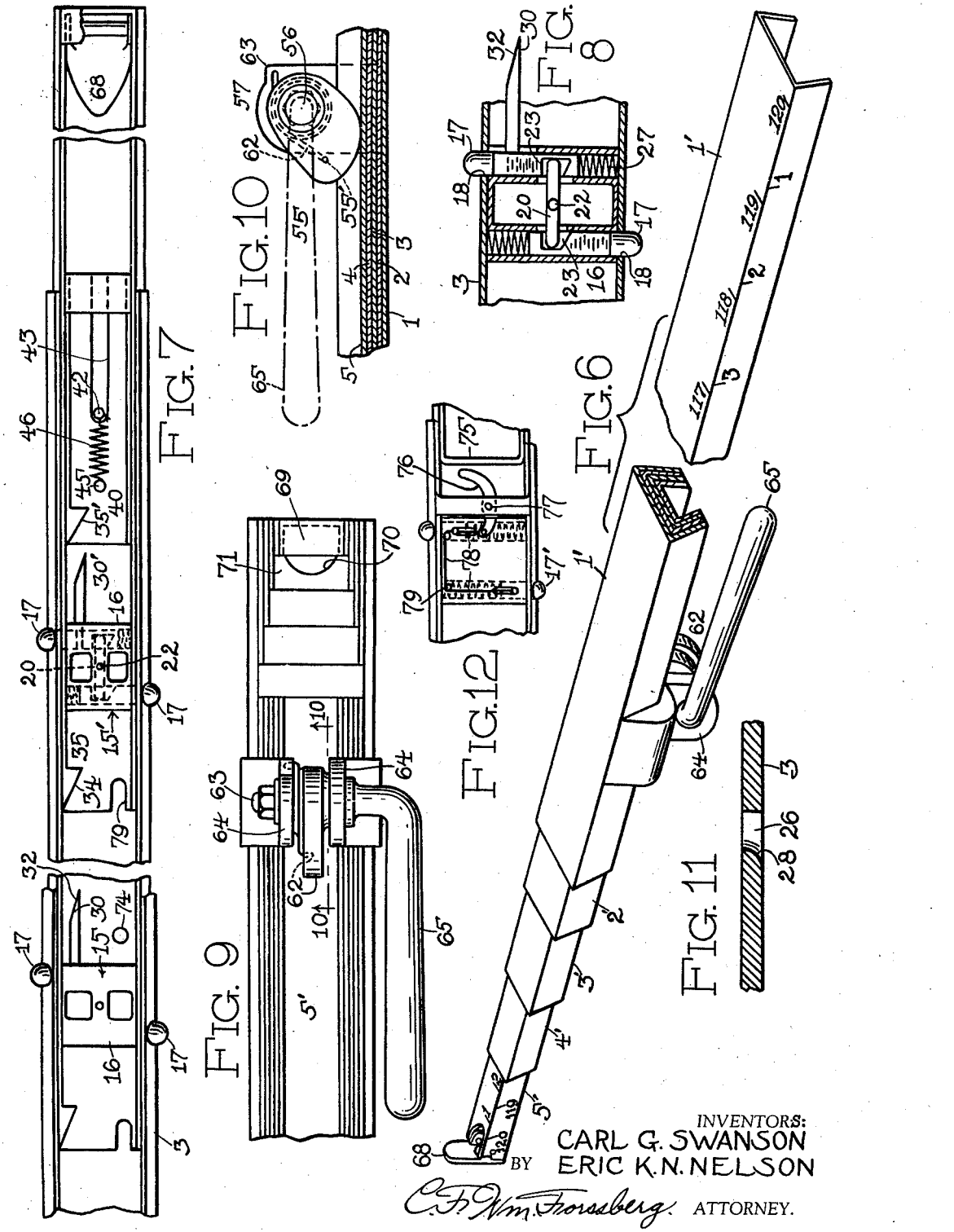

2,270,227

UNITED STATES PATENT OFFICE 2,270,227

TELESCOPING MEASURING RULE

Carl G. Swanson and Eric K. N. Nelson, New York, N. Y.; said Nelson assignor to said Swanson Application June 21, 1940, Serial No. 341,677

11 Claims. (Cl. 33—161)

This is a continuation in part of our copending application Serial No. 296,174, filed September 23, 1939.

The present invention relates to extensible measuring rules and scales made up of a series of telescoping rule sections which may either be extended as required or telescoped into each other in order to occupy a minimum of space.

An important object of our invention is to provide improved operative means for automatically locking the rule sections in extreme position when extended so as to prevent accidental slipping or relative movement as between the adjacent sections which would cause an inaccurate reading to be obtained.

Another object is to have improved operating means which are effective when in the act of telescoping or collapsing the rule sections, to cause one section as it approaches its fully telescoped position, to automatically release a lock on the next section in the series so as to allow said next section likewise to be telescoped.

A further object is to have operating means of the character indicated which can take several forms.

It is also an object of our invention to have upon a telescoping or extensible rule of the present character, two sets of scale markings of predetermined distances starting respectively at the opposite ends of the extended rule. By said means it is easy to read off the total distance being measured by merely adding together the complementary numbers on the two scale sections concerned as will be more fully explained hereinafter.

Other objects include simplicity of construction of the scale or rule, economy of manufacture, practical and easily operated form and durability withal.

Additional objects and the various advantages of our invention and its principles of construction and operation will appear more fully in detail as this specification proceeds when taken together with the accompanying drawings forming part hereof, in which—

Figure 1 is a perspective view of the preferred practical form of scale embodying our invention, the same being partly extended to disclose the sections;

Figure 2 is a fragmentary top view showing the outermost section and portions of the next two succeeding sections and showing means for locking and unlocking the outermost section and automatically operated means for locking and automatically unlocking the next two succeeding sections;

Figure 3 is another view similar to Figure 2 showing certain parts in altered positions to indicate operation;

Figure 4 is a fragmentary plan view of the scale showing a manually controlled mandrel locking means for holding the collapsed or partially collapsed sections in fixed position when the rule has been extended to cover the distance to be measured;

Figure 5 is a sectional view on the line 5—5 of Figure 4;

Figure 6 is a perspective view of a modified form of scale or rule, similar to that of Figure 1;

Figure 7 is a fragmentary top view of the scale of Figure 6, similar to that of Figure 2;

Figure 8 is a horizontal sectional view taken through one of the locking means of both forms of our scale and showing two spring pressed locking tongues or bullet heads together with a releasing trigger;

Figure 9 is a top plan view of the scale of Figures 6 and 7, similar to Figure 4, showing a modified mandrel locking means for holding the collapsed or partially collapsed sections in fixed position when the rule has been extended to cover the distance to be measured;

Figure 10 is a fragmentary longitudinal section taken on line 10—10 of Figure 9;

Figure 11 is a detail longitudinal section through the side wall of one of the component sections of the rule; and Finally, Figure 12 is a view similar to Figure 8, but disclosing a modified form of locking means.

Throughout the views, the same references indicate the same or like parts.

In the practice of our invention, and referring now more particularly to Figures 1 and 2, our improved rule comprises a series of telescoping sections 1, 2, 3 and 4 and it will be understood we may employ as many of these sections as desired, each of which is of any convenient length. As shown in Figures 1, 2 and 3 each of these sections comprises a U-shaped or channel member which in the closed or collapsed position of the rule are nested together, each section being slidable inside the next succeeding outer section.

The rule is provided with numbered scale markings upon the side thereof, preferably beginning at the end of the outermost section 1 which may conveniently be of some standard length, such as 24 or 36 or even 48 inches, etc., while the innermost section is also numbered but in the opposite direction beginning at the end and there continuing serially from the last number upon the outermost section adjacent the end 5. The result of this means of numbering the scale sections is that when the innermost section 4 is drawn out beyond the end 5 of the outermost section 1 the numbers can be read directly upon said section 4 as they appear immediately adjacent to the mentioned end 5. It is thus obvious that it is not necessary to calculate or add or perform any other mathematical function in order to ascertain the length to which the rule is extended when section 4 is partly or fully drawn out but instead the actually attained dimension can be read directly upon said section 4.

Adjacent the rear end of each section except the outer section, we have provided means indicated at 15 for locking adjacent each extended section to its adjacent outer section. At the left of Figures 2 and 7 we have shown one such locking means contained within the channel member forming section 3. The locking means 15 comprises a casing 16 contained in and rigid with the channel member forming the section. Located in the casing 16 and adapted to extend into openings or perforations 18 in the side walls of the channel 3 are two locking bolts or bullet heads 17. The heads 17, it will be noted, are longitudinally displaced from one another and are connected by a lever 20 which is pivoted at its center on a pin 22 secured at one end in the casing 16 and at its opposite end in the bottom of the channel member 3.

The ends of lever 20 extend respectively into tapered openings 23 in the heads 17 and bears against the side walls of the openings. A spring 27 in the casing 15 normally presses the upper right hand locking head outwardly and the force of this spring is communicated through the lever 20 to the lower left hand head 17, thus urging it outwardly in the opposite direction.

The opposite walls of the next succeeding outer channel member are provided near its outer end with openings 26 which in the extended position of section 3 are adapted to align with the openings 18 in section 3. When this occurs the spring 27 will force both heads into respective openings 26 thereby locking the sections 2 and 3 together. To facilitate the entry of bolt heads into the opening 26, we preferably cut away a portion of the wall as indicated at 28 so as to provide an inclined approach to the opening. We have provided means on intermediate sections whereby, when one section is telescoped into its next succeeding outer section, the lock on said next succeeding section is released. For this purpose, we provide one of the bullet catches or heads 17 with a forwardly projecting lug or trigger 30 having an inclined surface 32 adapted to be engaged by an inclined surface 34 of a projection 35 at the rear end of the next succeeding inner section. It will be seen that engagement of the surface 34 with the inclined surface 32 of the trigger 30 will serve to withdraw both bullet heads from their respective recesses 28 as shown in Fig. 3.

We also provide on the innermost section, that is, the one farthest extended when the rule is in use, a lock of a similar character to that described and we provide means whereby this particular lock may be released by hand. For this purpose we actuate the trigger 30' by means of an actuating inclined projection 6 on a slidable U-shaped member 7 in scale section or channel 4, said member being normally held in inactive retracted position against a stop 8 in said channel by a spring 9 connected at one end to said stop or pin 8 and at the other end to a pin 10 on member 7. A pendent finger piece 11 extends normally through a side slot 12 in the wall of channel 4 and is pivoted at 13 to slidable member 7, while a spring 14 attached to stop pin 8 urges the finger piece out through the slot.

As may particularly be noted in Fig. 3 the finger piece 11 may be shifted along the scale in slot 12 from the position indicated in broken lines 11'. This displacement will cause the U-shaped member 7 to slide toward trigger 30' so that inclined projection 7 will actuate this trigger and swing inner lever 20 about its axis in clockwise direction and thereby withdraw the bullet heads or locking members 17, 17 within the outline of the scale sections 3 and 4. This operation will immediately release scale section or channel 4 and allow the same to be pushed into channel 3 and during such telescoping by finger piece 11 will be pushed up into section 4 so as to occupy the position generally indicated at 14' in broken lines (Fig. 2).

In similar fashion the modification shown in Fig. 7 has a slidable U-shaped member 40 provided with an actuating projection 35' carried at the end of the U-shaped member in the channel or section 4 of the scale which is shown as the innermost member. The slidable member 40 is formed as a channel member having at its bottom a post 42 and a slot 43. The bottom of the channel section 4 has a post 45 extending up through the slot 43 and a spring 46 connects the posts 42 and 45 urging the actuating cam 35' away from the trigger 30'.

It will be seen that by moving the member 40 toward the lock 15' by the finger that the section 4 will be released and subsequently simply by telescoping the sections one into another the successive locks will be automatically released and the rule collapsed.

It is obvious that other means may be employed whereby the retracting movement of one section may release the lock on the next section. Thus the lug 35 may engage one end of a lever pivoted say centrally of the section 3 and extending upwardly and toward the right as viewed in Fig. 7, the opposite end of the lever being connected by a wire or otherwise with the end of the trigger 32.

In another form of locking means as illustrated in Fig. 12, the sections are formed with a rear wall or flange 75 adapted on retraction to engage the forward tapered end of an angular or bell crank lever 76 pivoted intermediate its ends at 77. The rear end of lever 76 is attached to one end of a cord or wire 78. Cord 78 extends laterally of the rule sections and is attached to the forward spring pressed tongue 17', thence it passes through brackets or eyes 79 and is attached at its opposite end to the rear locking tongue.

For the purpose of holding the outermost sections and any partially collapsed section together during actual measurement or when the scale is completely collapsed, we provide special friction means in the form of a hand wheel 55 fixed on a shaft 56 rotatable in a yoke 57 partially secured to the outermost scale member or channel 1 by means of brazing, welding or soldering, while the friction block 58 is mounted on the screw thread 59 of shaft 56 so that rotation of the shaft in one direction will cause the block to be forced against the sides of the channel making up the scale, crowding the side thus engaged against the side portion of the yoke 57. Obviously rotation of the shaft by wheel 55 in the opposite direction will force the friction block against the opposite edges of the scale sections as the result in either case so that the scale sections or channels are retained in any attained extended or telescoped position by means of friction. Upon rotation of the wheel 55 to release block 58 from engagement against the side of the innermost channel it will be possible to draw out the channel members until said channel members are established in final position between locks engaging the apertures, as for example, the locks 17, 17 in Fig. 3 within apertures 18, 18. In order to insure the position of the shaft 56 in the yoke and also avoid loss of said shaft a retaining collar 60 is fixed on one end of the shaft while the wheel 55 may either have a hub on the same as indicated at 61 or part 61 may actually be a collar which is located between the wheel and side of yoke 57.

Another form of friction brake or lock 7 retaining the outermost section and other partly collapsed sections together, etc., is disclosed in Figs. 6, 9 and 10, wherein a cam 62 is mounted upon a shaft 63 pivoted in lugs 64 secured to the sides of the outermost section 1' while one end of this shaft 63 is bent to form a handle 65. The cam 62 is maintained to bear against portions of the bottom of the innermost or collapsed or partially collapsed scale section or channel and is mounted at a sufficient height above the bottom of said member to allow swinging of the cam to clear and also bite upon casings 16, 16. The handle 65 is normally urged into a cam releasing position by means of a coil spring 66 secured at one end of the cam 62 and at the opposite end of a bracket 67 carrying one of the lugs 64.

To facilitate the application of the outer end of the rule to edges of objects to be measured, we have formed the outer end of the outer section 4 with a downwardly extending pivoted lip 68, the end 69 of the innermost section of the scale of Figs. 1–5 having a finger clearance 70 cut in the end 71 of the next adjacent scale member so that when the scale or rule is entirely telescoped it will be possible to insert the finger and draw out the innermost member after duly releasing the friction brake or cam as the case may be. In the preferred form shown in Figs. 1 and 4 the end 69 is actually spaced from the cross piece 72 of the next adjacent scale or channel member while the sides are cut at 73 (Fig. 1) to increase the clearance for the same purposes.

In order to prevent actual contact of any section of the rule of Fig. 6 with the casing 15' of the section behind the same which might result after continued use in loosening of the casing, we preferably form at the bottom of the section stops or bumpers 74 which are engaged by the forward wall of a slot 79 formed in the rear edge of the section ahead as it reaches its final retracted position.

The rule of the form shown in Figs. 7–12 preferably carries two scales, one beginning at the right and one at the left of Fig. 1. By means of these two scales with the numbers of the inner sections extended and the next to the outer section partly telescoped into the outer section, the reading of the entire distance with the inner sections fully extended and say the next to the outer sections partly telescoped may be readily obtained by merely adding the readings of one scale and adding it to the reading of the other scale at the line 5, that is at the forward end of the outer section 1, 2 or 3 whatever section is partially telescoped. Similarly with other sections extended, the measurement may be obtained by adding the readings at the juncture of partly telescoped sections.

From the foregoing it is evident that our scale is readily extended and may then be depended upon to retain any predetermined length of extensions by virtue of the locking means and friction lock or brake, etc., and due to the automatic releasing means in the two main forms of our invention it is also very easy to collapse or telescope the scale into its most compact condition.

The scale sections may be made of any desirable material although we prefer metal and any useful alloy and particularly the light aluminum alloys which are strong and serviceable while being so light that the scale as a whole will be quite convenient for a workman to carry and use.

Variations may be resorted to and parts and features used without others within the scope of our invention without departing from the spirit thereof.

Hence, having now fully described our invention, we claim:

1. In a measuring rule, a series of telescoping sections, means for locking successive sections in extended position, means effective upon occurrence of telescoping movement of one section to unlock another section, and further means for locking telescoped and partly extended sections together in attained positions.

2. In a measuring rule, a series of telescoping sections, means for automatically locking a section when it has reached a predetermined extended position, means effective upon occurrence of a telescoping movement of one section to unlock the next successive section, means for locking the outermost section upon its reaching a predetermined extended position, hand operated means for releasing said last named means, and means for locking telescoped and partly extended sections together in attained positions.

3. In a measauring rule, a series of telescoping sections, means for automatically locking a section when it has reached a predetermined extended position, means effective upon occurrence of a telescoping movement of one section to unlock the next successive section, means for unlocking the outermost section upon its reaching a predetermined extended position, and hand operated means for releasing said last named means, and means for tightly clamping all telescoped on partially telescoped sections together.

4. In a measuring rule comprising a nest of channel members forming a series of telescoping sections, each of substantially U-shape in cross section, means for locking successive sections in extended position, means effective upon retracting one section to unlock another section, and means for clamping retracted and partially retracted sections together.

5. In a device for locking two slidable channel members each having a pair of corresponding locking openings, the openings of one pair being adapted to move into alignment with corresponding openings of the other pair, a casing secured to one of the members, a pair of locking heads in said casing normally extending into the respective openings in said one member, an operating lever connecting said heads and spring means urging said heads through the openings in said one member and into the corresponding openings in said other member located in opposite sides of the channel.

6. A measuring rule according to claim 2, in which the means for locking the outermost section in extended position includes a pivotally mounted cam retained in position by a pair of lugs secured to the outermost rule section and a handle rigid with said cam for rotating the same.

7. A measuring rule according to claim 2, wherein the means for locking the outermost section in extended position includes a friction brake in the form of clamping means including a member rotatably supported upon said outermost member in a position transversely of the side walls thereof and having a clamping member mounted thereon with a portion extending between the side walls of the innermost rule section and effective to clamp the walls of the various rule sections frictionally together at will, and a handle for manually operating said clamping means.

8. A measuring rule according to claim 2, wherein the means for locking the outermost section in extended position includes a rotatable shaft mounted upon the outermost rule section, manual means fixed upon said shaft for manually rotating the same, a thread upon at least the intermediate portion of said shaft, and an interiorly threaded block mounted upon said shaft and fitting said thread so that rotation of the shaft will shift said block axially along said shaft into clamping engagement against the walls of the rule sections.

9. A device for locking and releasing two relatively slidable channel members according to claim 5, including a slidable member rotated in the inner of the channel members, and carrying releasing means for releasing the operating lever connecting the heads, a projecting released member connected to said lever for moving the same located in the path of said releasing means, a swinging finger piece pivoted at one end to said slidable member and urged out through a slot in the side of said inner rule section by a spring and a return spring connected to said slidable member and to the inner rule section within which the slidable member is movable for retracting slidable member as having been forced forward by manually engaged said finger piece so as to bring the releasing means upon said slidable member into an engagement with the releasing member connected to the lever, said finger piece being collapsible within the outline of the inner rule section upon telescoping said section within the outer rule section.

10. In an extensible measuring rule, a series of telescoping rule sections, means including spring operated locking members for automatically engaging the sides of a section so as to lock the same in attained position when it has reached a predetermined extended position, releasing means effective upon occurrence of a telescoping movement of one section to unlock the next succeeding section, means for locking the innermost section upon its reaching an extended position, and hand operated means including a lever pivoted within the outline of said innermost section for releasing the last mentioned locking means, said lever being capable of extending out through a side wall of said innermost rule section in extended position of the latter and manually shiftable into retracted position within said side wall for releasing said locking means.

11. In a measuring rule, a series of telescoping rule section, means for automatically preventing further movement of a rule section when it has reached a predetermined extended position, means effective upon occurrence of a telescoping movement of one section to release the next successive section from said first mentioned means, means for locking the outermost section upon its reaching a predetermined extended position, and hand operated means for releasing the last mentioned locking means, and further hand operated means having a rotatable portion and serving to clamp portions of all telescoped or partially telescoped sections together through the walls thereof.

CARL G. SWANSON.
ERIC K. N. NELSON.